US010149125B1

(12) United States Patent
Oroskar et al.

(10) Patent No.: US 10,149,125 B1
(45) Date of Patent: Dec. 4, 2018

(54) DYNAMIC ADJUSTMENT OF UPLINK COORDINATED MULTIPOINT SERVICE

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 500 days.

(21) Appl. No.: 14/684,287

(22) Filed: Apr. 10, 2015

(51) Int. Cl.
*H04W 4/18* (2009.01)
*H04W 72/04* (2009.01)
*H04L 5/00* (2006.01)
*H04W 8/24* (2009.01)

(52) U.S. Cl.
CPC ............ *H04W 4/18* (2013.01); *H04L 5/0035* (2013.01); *H04W 8/24* (2013.01); *H04W 72/0413* (2013.01)

(58) Field of Classification Search
CPC ..... H04W 4/18; H04W 8/24; H04W 72/0413; H04L 5/0035
USPC ......................................................... 370/329
See application file for complete search history.

(56) References Cited

U.S. PATENT DOCUMENTS

| 8,494,518 B1 | 7/2013 | Shah et al. |
| 2001/0038630 A1 | 11/2001 | Tong et al. |
| 2003/0161328 A1 | 8/2003 | Chase et al. |
| 2008/0253319 A1 | 10/2008 | Ji et al. |
| 2012/0088455 A1 | 4/2012 | Love et al. |
| 2012/0176887 A1* | 7/2012 | Mcbeath ............... H04L 1/1822 370/216 |
| 2012/0282942 A1 | 11/2012 | Uusitalo et al. |
| 2013/0083783 A1 | 4/2013 | Gupta et al. |
| 2013/0114517 A1 | 5/2013 | Blankenship et al. |
| 2013/0322370 A1* | 12/2013 | Fong ................... H04W 72/048 370/329 |
| 2013/0343273 A1 | 12/2013 | Barbieri et al. |
| 2014/0056237 A1 | 2/2014 | Eriksson et al. |

(Continued)

FOREIGN PATENT DOCUMENTS

| EP | 2 385 653 A2 | 11/2011 |
| WO | 13/138779 A1 | 9/2013 |
| WO | 14/062104 A1 | 4/2014 |

OTHER PUBLICATIONS

Irmer et al., "Coordinated Multipoint: Concepts, Performance, and Field Trial Results", IEEE Communications Magazine, 2011, 102-111.

(Continued)

*Primary Examiner* — Stephen J Clawson

(57) ABSTRACT

Coordinated multipoint (CoMP) can improve uplink service in cellular networks. However, uplink CoMP can also burden an access network, such as by increasing processing loads at base stations and/or increasing traffic on backhaul links between base stations. Accordingly, exemplary methods and systems help to dynamically select an uplink CoMP mode for a user equipment (UE) based on various factors, such as whether the UE is located at a border cell, whether or not carrier aggregation is being utilized for downlink communications with the UE, and/or whether or not the UE is a heavy data user, among other possible factors.

19 Claims, 7 Drawing Sheets

(56) References Cited

U.S. PATENT DOCUMENTS

| | | | |
|---|---|---|---|
| 2014/0204871 A1* | 7/2014 | Ode | H04B 7/024 370/329 |
| 2014/0241323 A1* | 8/2014 | Park | H04L 5/0035 370/332 |
| 2016/0204838 A1* | 7/2016 | Park | H04B 7/024 370/252 |

OTHER PUBLICATIONS

The 3G4G Blog: Coordinated Multi-Point (CoMP) transmission and reception, 2010, 14 pages, printed Feb. 26, 2015, http://blog.3g4g.co.uk/2010/02/coordinated-multi-point-comp.html.
Mahalingam, "Coordinated Multipoint Tx and Rx", White Paper Radisys, Radisys Corporation, 2011, 7 pages.
Ghaleb et al., "QoS-Aware Joint Uplink-Downlink Scheduling in FDD LTE-Advanced with Carrier Aggregation", IEEE, 2014, pp. 111-115.
U.S. Appl. No. 14/531,628, filed Nov. 3, 2014.
"Carrier Aggregation—Activation and Deactivation of Secondary Calls," How LTE Stuff Works?, printed from the World Wide Web, dated Oct. 17, 2014.
Co-Pending U.S. Appl. No. 14/447,604, filed Jul. 30, 2014.
Co-Pending U.S. Appl. No. 14/543,465, filed Nov. 17, 2014.
Co-Pending U.S. Appl. No. 14/575,428, filed Dec. 18, 2014.
Co-Pending U.S. Appl. No. 14/575,455, filed Dec. 18, 2014.

* cited by examiner

DYNAMIC ADJUSTMENT OF UPLINK COORDINATED MULTIPOINT SERVICE

BACKGROUND

Many people use mobile stations, such as cell phones, personal digital assistants (PDAs), tablet computers, laptop computers, desktop computers, in-car computers, and so on, to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

To meet increasing demand for high-speed data on mobile devices, cellular service providers have begun implementing "4G" networks, which provide service under one or more 4G air interface protocols, such a long-term evolution (LTE) protocol. LTE was developed by the 3$^{rd}$ Generation Partnership Project (3GPP), and is based on GSM/EDGE and UMTS/HSPA network technology.

In the context of LTE, a mobile station is typically referred to as a "user entity" (UE), and may take various mobile and stationary forms, such as a mobile phone, tablet computer, laptop computer, desktop computer, or any other device configured for wireless communication. Herein, the terms "mobile station," "wireless communication device" (or WCD), and "user entity" (or UE) may be used interchangeably.

Further, each coverage area in a cellular network may operate on one or more carriers each defining a respective downlink frequency range or "downlink channel" for carrying communications from the base station to UEs and a respective uplink frequency range or "uplink channel" for carrying communications from UEs to the base station. Further, both the downlink channel and uplink channel of each carrier may be divided into sub-channels for carrying particular communications, such as one or more control channels for carrying control signaling and one or more traffic channels for carrying application-layer data and other traffic.

In general, when a UE is positioned within coverage of a base station, the base station may serve the UE on a particular carrier and may allocate resources on that carrier for use to carry communications to and from the UE.

For instance, in a system operating according to an orthogonal frequency division multiple access (OFDMA) protocol, such as LTE, the air interface is divided over time into frames and sub-frames each defining two slots, and the uplink and downlink channels are divided over the bandwidth of the carrier into sub-carriers that are grouped within each slot into resource blocks. When a UE is positioned within coverage of a base station in such a system, the UE may register or "attach" with the base station, and the base station may then schedule particular downlink and uplink resource blocks on the air interface to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

With such an arrangement, the bandwidth of the carrier on which the base station serves a UE may define an effective limit on the rate of data communication between the base station and the UE, as the bandwidth would define only a limited number of resource blocks per slot, with data rate per resource block being further limited based on air interface conditions. By way of example, in accordance with the LTE standard, the uplink and downlink channels on each carrier may be 3 MHz, 5 MHz, 10 MHz, 15 MHz, or 20 MHz, each resource block spans 180 kHz, and each slot is 0.5 milliseconds long. Accounting for guard bands at the edges of each carrier, the maximum number of resource blocks per 0.5 millisecond slot is thus 15 in 3 MHz, 25 in 5 MHz, 50 in 10 MHz, 75 in 15 MHz, and 100 in 10 MHz. Consequently, an LTE base station (interchangeably referred to as a an "eNodeB" herein) that serves UEs on such a carrier would have only the specified number of resource blocks available to allocate for air interface communication per slot, with coding rate in each resource block being further limited based on air interface conditions.

One way to help overcome this per-carrier data rate limitation is to have a base station serve a UE on multiple carriers at once, providing what is known as "carrier aggregation" service. With carrier-aggregation service, multiple carriers from either contiguous frequency bands or non-contiguous frequency bands are aggregated together as "component carriers" to increase the overall bandwidth available per slot by providing a greater number of resource blocks in which the eNodeB can schedule uplink and downlink communication. Further, where the concurrently-used component carriers are sufficiently distant from each other in the frequency spectrum, serving a UE concurrently on those component carriers may additionally create a frequency-diversity effect that could further improve data throughput.

In a further aspect of OFDMA protocols, such as LTE, reception at cell edges may be problematic for various reasons. For example, the greater distance to a base station at a cell edge may result in lower signal strength. Further, at a cell edge, interference levels from neighboring cells are likely to be higher, as the wireless communication device is generally closer to neighboring cells when at a cell edge.

In an effort to improve the quality of service at cell edges, 3GPP LTE-A Release 11 introduced a number of Coordinated Multipoint (CoMP) schemes. By implementing such CoMP schemes, a group or cluster of base stations may improve service at cell edges by coordinating transmission and/or reception in an effort to avoid inter-cell interference, and in some cases, to convert inter-cell interference into a usable signal that actually improves the quality of service that is provided.

LTE-A Release 11 defined a number of different CoMP schemes or modes for both the uplink (UL) and the downlink (DL). For the downlink, two basic types of CoMP modes are set forth: joint processing (JP) schemes and coordinated scheduling/beamforming (CSCH or DL-CSCH) schemes. For the uplink, numerous types of CoMP modes have been devised.

Uplink CoMP modes may involve interference rejection combining (IRC) or coordinated scheduling for purposes of reducing or preventing interference between transmissions from different user entities (UEs). Additionally or alternatively, various uplink CoMP modes may involve "joint reception" and/or "joint processing." Joint reception generally involves multiple base stations receiving an uplink signal that is transmitted by a given UE. Joint processing generally involves the multiple base stations that received the uplink signal from the UE, sending the respectively received signals or a decoded and/or processed version of the respectively received signals to one another, or just to a master base station in the group, such that the multiple received versions of the UE's transmission can be combined to improve reception and/or reduce interference.

Various types of joint processing have been implemented on the uplink. For example, joint processing on the uplink can be centralized. When a centralized CoMP mode is implemented on the uplink, the coordinating base stations may simply pass the entire received signal from a given UE on to a master base station, which then uses the received signals from multiple base stations to decode and/or process the signal from the given UE. Joint processing on the uplink can also be de-centralized to varying degrees. Specifically, when a decentralized CoMP mode is implemented on the uplink, a coordinating base station may decode and/or process the received signal from a given UE, and then send the decoded and/or processed signal from the given UE to the master base station. The master base station can then combine or select from the decoded and/or processed versions of the UE's transmission, which are sent to the master base station from one or more coordinating base stations that receive the UE's signal (and possibly a version of the UE's signal that is received at the master base station itself).

OVERVIEW

Exemplary embodiments may help to dynamically select an uplink coordinated multipoint (CoMP) mode for a particular user equipment (UE), based on one or more of a number of a different factors. In particular, a serving base station for a UE may consider factors such as whether the UE is located at a border cell, whether or not carrier aggregation is being utilized for downlink communication with the UE, whether or not the UE is a heavy data user, and/or other factors, in order to intelligently determine a particular uplink CoMP mode that should be used to receive and/or process uplink communications from the UE.

As noted, a serving eNodeB may take carrier aggregation service (or lack thereof) into account when selecting an uplink CoMP mode for a UE. More specifically, under LTE, a user equipment (UE) typically sends acknowledgment (ACK) messages to confirm receipt of downlink communications from the LTE network. Receipt of these ACK messages by an eNodeB is of importance, as an eNodeB uses these ACK messages to dictate the flow of communications on the downlink. However, UEs will typically only send ACK messages for one carrier, even if they are provided carrier-aggregation service via multiple carriers that are served by two or more different eNodeBs. Thus, redundancy may be desirable in order to increase the probability that ACK messages are received. Accordingly, in some embodiments, a serving eNodeB may enable uplink CoMP, may increase the likelihood that uplink CoMP will be enabled for a UE, and/or may enable an uplink CoMP mode that utilizes more network resources, when carrier aggregation is being utilized for downlink communication with the UE.

Further, when carrier aggregation is utilized for downlink communications with a UE, it may be desirable for these ACK messages to be utilized not only on the primary carrier, but also on the secondary carrier or carriers. Thus, if secondary carriers are served by different eNodeB, a serving eNodeB may enable an uplink CoMP mode in which ACK messages are included in the information that is exchanged between eNodeBs that are coordinating to provide uplink CoMP for the UE.

As further noted above, a serving eNodeB may take the level of data usage by the user of a particular UE into account when selecting an uplink CoMP mode for the UE. In an exemplary embodiment, the level of data usage may be indicated by a data-usage class that is associated with a particular UE. In particular, a UE may have an associated user account or a unique device identifier that track data usage by the device (and possibly by the associated user account on other devices as well). Based on the associated usage data, a data-usage class may be associated with the device; e.g., a heavy-user class, a normal-user class, and/or a light-user class, among other possibilities. In some scenarios, it may be desirable for a service provider to impose a relatively strict policy on a UE that is associated with a user-account of a heavy data user (e.g., one that engages in an amount of data communication that is deemed to be excessive). For example, since enabling CoMP can increase the amount of network resources that are allocated for a particular UE's uplink communication, a serving eNodeB may enable or disable uplink CoMP, and/or may select a particular CoMP mode for a UE, based on the data-usage class associated with UE (e.g., which indicates either heavy or normal data usage).

In a further aspect, CoMP may provide more benefits at border sectors (i.e., sectors where a neighbor sector is served by a different eNodeB). As such, exemplary embodiments may further consider whether or not a UE is located in a border sector when determining an uplink CoMP mode for the UE. For instance, a serving eNodeB may disable uplink CoMP when a UE is not located in a border sector, and only consider whether to enable uplink CoMP when a UE is located in a border sector. More specifically, when the serving eNodeB detects that a UE is located in a border sector, the serving eNodeB may implement an exemplary method in order to intelligently select an uplink CoMP mode for the UE based on one or more other factors, such as the carrier-aggregation status of the UE and/or the data-usage class of the UE, among other possibilities.

More generally, an exemplary method may involve a base station: (a) determining a carrier-aggregation status corresponding to a UE that is operating in a coverage area served by the base station; (b) based at least in part on the carrier-aggregation status corresponding to the UE, selecting an uplink coordinated multipoint (CoMP) mode from a plurality of uplink CoMP modes; and (c) receiving an uplink communication from the UE according to the selected uplink CoMP mode.

In a further aspect, another exemplary method may involve a base station: (a) determining a data-usage class that is associated with a UE, wherein the data-usage class is one of a plurality of pre-defined data-usage classes; (b) based at least in part on the associated data-usage class, selecting an uplink coordinated multipoint (CoMP) mode from a plurality of uplink CoMP modes; and (c) receiving an uplink communication from the UE according to the selected uplink CoMP mode.

In another aspect, an exemplary network component, such as an eNodeB, may include: (i) one or more communication interfaces configured for uplink and downlink communication with a user equipment (UE) that operates in a coverage area of the base station; (ii) at least one processor; and (iii) a non-transitory computer readable medium comprising program instructions stored thereon that are executable by the at least one processor to: (a) determining a carrier-aggregation status corresponding to the UE; (b) based at least in part on the carrier-aggregation status corresponding to the UE, select an uplink coordinated multipoint (CoMP) mode from a plurality of uplink CoMP modes; and (c) receive, via at least one of the communication interfaces, an uplink communication from the UE according to the selected uplink CoMP mode.

In yet another aspect, an exemplary network component, such as an eNodeB, may include: (i) one or more communication interfaces configured for uplink and downlink communication with a user equipment (UE) that operates in a coverage area of the base station; (ii) at least one processor; and (iii) a non-transitory computer readable medium comprising program instructions stored thereon that are executable by the at least one processor to: (a) determine a data-usage class that is associated with the UE, wherein the data-usage class is one of a plurality of pre-defined data-usage classes that indicate levels of data usage; (b) based at least in part on the associated data-usage class, select an uplink coordinated multipoint (CoMP) mode from a plurality of uplink CoMP modes; and (c) receive an uplink communication from the UE according to the selected uplink CoMP mode.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Further, methods and systems may be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

I. Exemplary Network Architecture

Figure 1A:
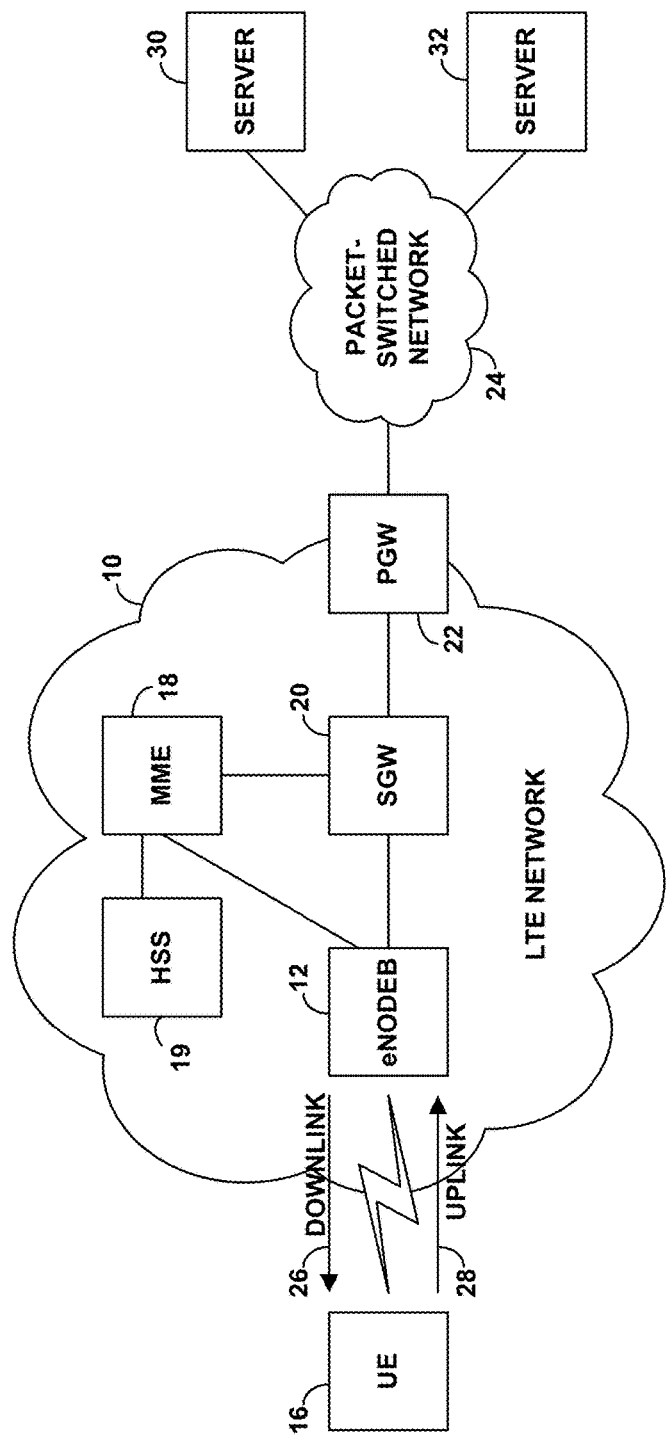
FIG. 1A is a simplified block diagram of a wireless communication system in which the present method and system can be implemented.

Referring to the drawings, FIG. 1A is a simplified block diagram of a wireless communication system in which the present method and system can be implemented. In particular, FIG. 1A depicts a representative LTE network 10, which functions primarily to serve UEs with wireless packet data communication service, including possibly voice-over-packet service, but may also provide other functions. As shown, the LTE network 10 includes a base station (eNodeB) 12, which has one or more antenna structures and associated equipment for providing one or more LTE coverage areas in which to serve UEs such as an example UE 16 as shown.

The eNodeB 12 has a communication interface with a mobility management entity (MME) 18 that functions as a signaling controller for the LTE network 10. Further, the eNodeB 12 has a communication interface with a serving gateway (SGW) 20. MME 18 may be communicatively coupled to a home subscriber server (HSS) 19, which stores subscriber information, and may also be communicatively coupled to the SGW 20. SGW 20 in turn has a communication interface with a packet-data network gateway (PGW) 22, which may provide connectivity with a packet-switched network 24. In practice, the illustrated components of the LTE network 10 may sit as nodes on a private packet-switched network owned by an operator of the LTE network 10, and thus the various communication interfaces may be logical interfaces through that network.

As illustrated, the air interface 14 for a given sector served by eNodeB 12 may have a downlink direction 26 from the eNodeB 12 to the UE 16, and an uplink direction 28 from the UE 16 to the eNodeB 12. Further, the eNodeB 12 and the UE 16 may be configured (e.g., licensed and programmed) to support air interface communication on various particular carriers, which may be FDD or TDD, for example. Each such carrier and/or its particular downlink and uplink channels may be identified by one or more globally unique identifiers per industry standard, so that the eNodeB 12 and a served UE can refer to particular carriers by those identifiers.

According to LTE, each carrier's downlink channel may then define various sub-channels, such as a physical downlink control channel (PDCCH) for carrying scheduling directives and other control signaling from the eNodeB 12 to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB 12 and a physical uplink shared channel (PUSCH) for carrying scheduled uplink data communication.

With this arrangement, when the UE 16 enters into coverage of the eNodeB 12, the UE 16 may detect the eNodeB's 12 coverage on a particular carrier, and the UE 16 may engage in an attach process or handover process to register with the LTE network 10 on that carrier. For instance, the UE 16 may initially transmit to the eNodeB 12 an attach request, which the eNodeB 12 may pass along to the MME 18, triggering a process of authenticating the UE 16 and establishment of one or more logical bearer connections for the UE 16 between the eNodeB 12 and the PGW 22.

Further, the UE 16 may engage in signaling with the eNodeB 12 to establish a radio-link-layer connection (i.e., air interface connection) on the detected carrier, so that the eNodeB 12 may then serve the UE 16 on that carrier. For instance, the UE 16 and the eNodeB 12 may exchange radio resource control RRC configuration messaging to prepare the eNodeB 12 to serve the UE 16 on the carrier and to prepare the UE 16 to be served on the carrier. In this process, the eNodeB 12 may store a context record for the UE 16, indicating that the eNodeB 12 is serving the UE 16 on the particular carrier, so that the eNodeB 12 may then serve the UE 16 on the indicated carrier (e.g., then exchanging control signaling and bearer traffic with the UE 16 on that carrier) per that context record. Further, the UE 16 may store a context record indicating that the UE 16 is being served on that carrier, so that the UE 16 can then be served on that carrier (e.g., then exchanging control signaling and bearer traffic with the eNodeB 12 on that carrier) per that context record. As such, the radio-link-layer connection could be considered to effectively encompass initially just that one carrier.

II. Coordinated Multipoint

As noted above, a network such as communication network 10 may implement various types of coordinated multipoint (CoMP) service, through which base stations (e.g., eNodeBs) may coordinate to improve uplink and/or downlink service. CoMP schemes designed for coordinated transmission by base stations may be referred to as downlink CoMP modes, while CoMP schemes designed for coordinated reception may be referred to as uplink CoMP modes.

Figure 1B:
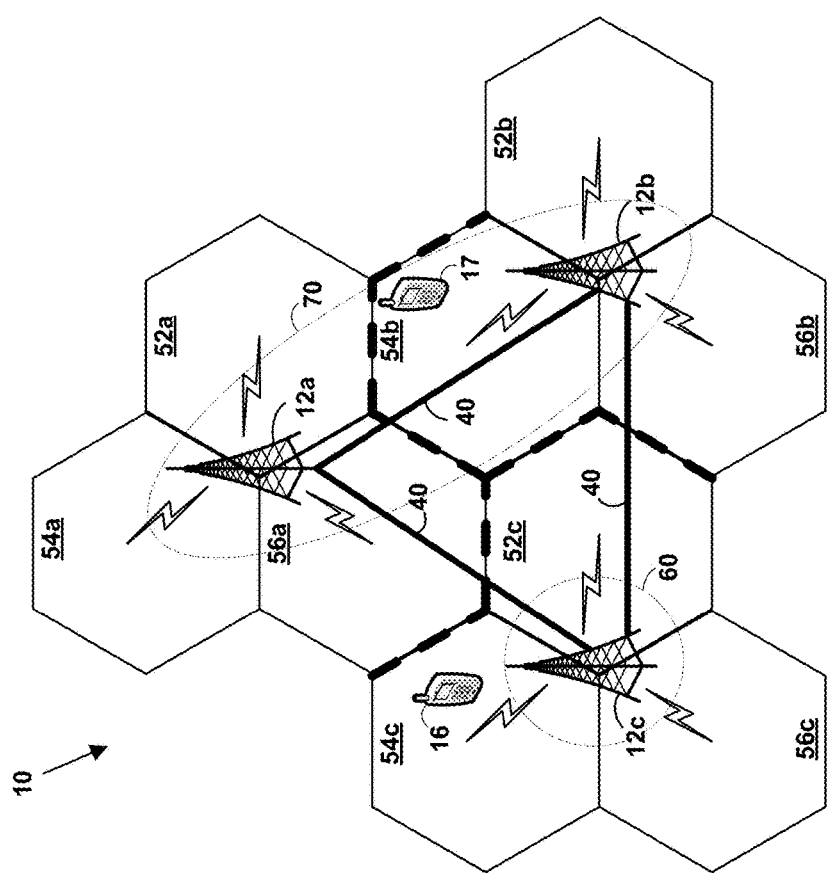
FIG. 1B is a simplified block diagram illustrating a portion of communication network in which CoMP schemes may be implemented.

FIG. 1B is a simplified block diagram illustrating a portion of communication network 10 in which CoMP schemes may be implemented for uplink and/or downlink communications. In particular, FIG. 1B shows a portion of an LTE network, which includes three eNodeBs 12a to 12c. More or less eNodeBs, and/or other types of access points or base transceiver stations, are also possible. As shown, eNodeB 12a is serving three coverage areas or sectors 52a, 54a, and 56a, eNodeB 12b is serving three coverage areas or sectors 52b, 54b, and 56b, and eNodeB 12c is serving three coverage areas or sectors 52c, 54c, and 56c. Further, a UE 16 is operating in sector 54c, which is served by eNodeB 12c. Further, while not shown in FIG. 1B, each eNodeB 12a to 12c may be configured in the same or in a similar manner as the eNodeB 12 shown in FIG. 1A. For instance, each eNodeB 12a to 12c may be communicatively coupled to an MME and/or an SGW. Further, note that some or all of eNodeBs 12a to 12c may be communicatively coupled to the same MME and/or the same SGW. Alternatively, each eNodeB 12a to 12c might be connected to a different MME and/or different SGW.

In some cases, uplink CoMP may be implemented by a single base station, which provides service in multiple sectors. This type of CoMP scheme may be referred to as an "intra base station" or "intra-eNodeB" CoMP scheme. For example, eNodeB 12c may provide uplink CoMP by utilizing and/or combining uplink signals from a UE that are received at two or more of the sectors 52c, 54c, and 56c that are served by eNodeB 12c. In particular, eNodeB 12c may define a CoMP group 60 to include all its sectors 52c, 54c, and 56c. As such, eNodeB 12c may adaptively use joint processing techniques and/or interference rejection combining (IRC) techniques when the uplink signal from UE 16 is received at two or more of the sectors 52c, 54c, and 56c that it serves.

In other cases, uplink CoMP may be implemented by multiple base stations, which may each provide service in multiple sectors or only in one cell. This type of CoMP scheme may be referred to as an "inter base station" or "inter-eNodeB" CoMP scheme. For example, eNodeBs 12a and 12c may provide uplink CoMP by utilizing and/or combining uplink signals from UE 17 that are received at two or more of the sectors 52a, 54a, 56a, 52b, 54b, and 56b that are served by eNodeBs 12a and 12b. (Those skilled in the art will understand that in the context of CoMP the "uplink signals" received at different base stations result from the same uplink signal that is transmitted by the UE, but are different because the transmission is "perceived" differently in the different sectors.)

Figure 2:
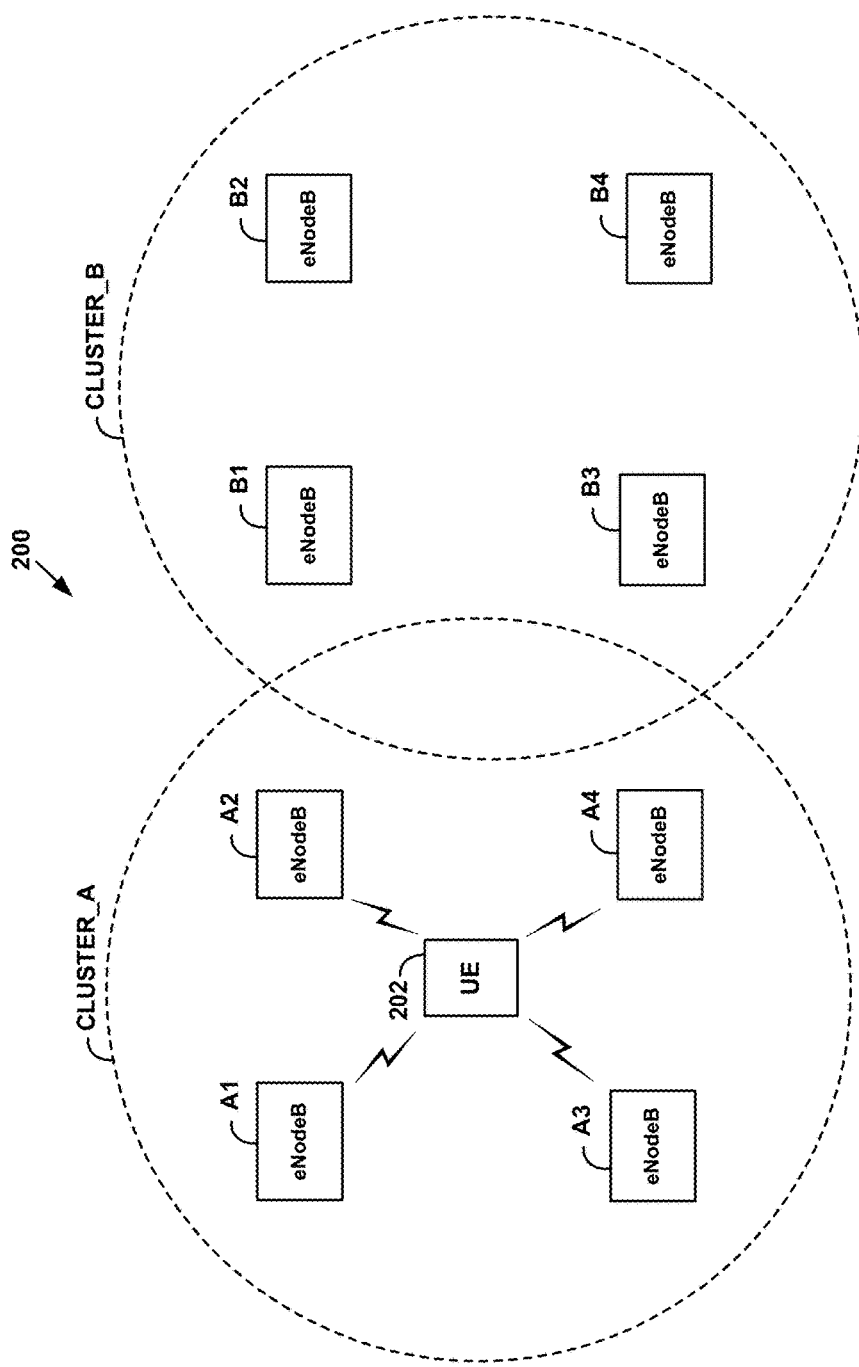
FIG. 2 is a simplified block diagram illustrating a portion of an LTE network in which inter-eNodeB CoMP service may be implemented.

FIG. 2 is a simplified block diagram illustrating a portion of an LTE network in which inter-eNodeB CoMP service may be implemented. In particular, FIG. 2 shows a portion of an LTE network 200, which includes eNodeBs A1 to A4 and eNodeBs B1 to B4. Further, a UE 202 is operating in the illustrated portion of the LTE network.

When uplink CoMP involves multiple base stations (e.g., as in inter-base station CoMP), the base stations may coordinate with one another via a backhaul network, which allows for communications between base stations and/or other network components. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. In FIG. 1B, eNodeBs 12a to 12c are communicatively connected via X2 links 40. It should be understood, however, that other types of backhaul communications are also possible. Similarly, while X2 links are not shown in FIG. 2, eNodeBs A1 to A4 and eNodeBs B1 to B4 may be interconnected via X2 links or another type of backhaul link.

In both intra-eNodeB and inter-eNodeB CoMP, there may be pre-defined groups of sectors, which may be referred to herein as "CoMP groups" or "CoMP clusters." The eNodeB or eNodeBs that serve the sectors in a CoMP group are configured to provide uplink CoMP using some or all of the sectors in the group.

For example, in FIG. 2, base stations A1 to A4 and B1 to B4 may be grouped into clusters that can coordinate to provide various types of inter-eNodeB CoMP. In the illustrated scenario, there are two clusters: (i) cluster_A, which includes eNodeBs A1 to A4, and (ii) cluster_B, which includes eNodeBs B1 to B4. Further, in the illustrated scenario, UE 202 is being served by the eNodeBs A1 to A4 in cluster_A. Note that the clusters, such as cluster_A and cluster_B, may be predetermined and static. Alternatively, the LTE network may dynamically and intelligently update the clustering of base stations in an effort to improve service.

In a further aspect, to facilitate inter-eNodeB CoMP, a master base station may be specified for each cluster of eNodeBs. The master base station in a cluster may take the lead to coordinate various functions between the base stations in the cluster. For example, eNodeB A1 may function as the master base station (or master eNodeB) in cluster A, and eNodeB B1 may function as the master base station in cluster B. In some embodiments, the serving base station for each UE may be designated as a master base station for that UE. Other examples, in which a UE's serving base station is not designated as the master base station for that UE, are also possible. Further, the non-master base stations may be referred to herein as coordinating base stations or as neighbor base stations or eNodeBs, or as secondary base stations or eNodeBs.

In a further aspect, the coordinating eNodeB may determine which sectors and/or which eNodeBs from the CoMP group should be used to provide uplink CoMP for a given UE, at a given point in time. In particular, the coordinating eNodeB may determine a subset of the CoMP group that should be utilized for a given UE, based on various factors. Possible factors include, but are not limited to, whether or not a signal from the given UE is received in a candidate sector, signal strength and/or other air interface conditions in the candidate sector, and/or processing load at the eNodeB serving the candidate sector, among other possibilities. In the case of intra-eNodeB uplink CoMP, the process of the eNodeB selecting a subset of sectors from the sectors in its uplink CoMP group to provide uplink CoMP for a particular UE may be referred to as "adaptive sector selection."

In a further aspect, various types of uplink CoMP modes are possible. (Note that herein, a given CoMP mode may also be referred to as a CoMP "scheme.") Further, as will be explained below, when inter-eNodeB CoMP is implemented, different uplink CoMP modes may have differing effects on: (a) the CPU load of the master base station and/or on the CPU load(s) of secondary base station(s) with which the master base station coordinates to implement uplink CoMP and/or (b) the traffic level on the backhaul network resulting from uplink CoMP.

An interference rejection combining (IRC) mode may be used to reduce or cancel interference at a receiving base station (e.g., the master eNodeB in an inter-eNodeB CoMP cluster), or in the receiving sector, in the case of intra-eNodeB CoMP. When only IRC is implemented, there is very little coordination required between the base stations an inter-eNodeB CoMP group. Therefore, in the case of inter-base-station uplink CoMP, IRC-only does not significantly increase the CPU load at a coordinating base station, nor does it significantly increase the load on the backhaul network (e.g., on X2 links between base stations).

Some uplink CoMP modes may involve joint reception, such that a UE's uplink signal is received in two or more sectors. When joint reception is implemented, multiple UEs can simultaneously transmit on the PUSCH, and may use the same RB when doing so. The PUSCHs may be received in multiple sectors, and in the case of inter-eNodeB CoMP, by multiple eNodeBs. The PUSCHs received in different sectors may be combined using various joint processing techniques, such as a mean squared error (MMSE) or zero forcing (ZF) process. Further, joint reception and joint processing may be combined with other types of uplink CoMP techniques, such as IRC, adaptive antennas, and/or multi-user detection schemes, in an effort to further improve performance and/or for other reasons.

In a further aspect, CoMP modes that include joint processing may be centralized or decentralized to varying degrees. Specifically, in the context of inter base station CoMP, the extent to which a coordinating base station decodes and/or processes a received signal, before sending to the master base station, may vary in different CoMP modes. Since different CoMP modes can increase or decrease in the amount of decoding and/or processing that is done by the coordinating base station, different CoMP modes can in turn increase or decrease the CPU load of the coordinating base station, respectively. Further, increasing the amount of decoding and/or processing that is performed by the coordinating base station may result in less data that is transferred over the backhaul network (e.g., over an X2 link) to the master base station. Specifically, less data may be transferred because, e.g., the size of the decoded signal may be less than the size of the received signal.

As an example, a first type of joint processing may involve a coordinating eNodeB sending the master eNodeB the received signal via an X2 interface, without having decoded the received signal. Specifically, coordinating eNodeB may send raw I/Q data to the master eNodeB via an X2 interface between these two eNodeBs. The raw I/Q data may include all the physical layer bits received by the eNodeB. This first type of joint processing may be referred to herein as "centralized" joint processing.

A second type of joint processing may involve a coordinating eNodeB decoding a received signal before sending it to the master eNodeB. For example, the decoding process may involve the coordinating eNodeB may extracting user data (e.g., packet data) from the physical layer bits in the received signal, such as by removing phase information represented by I/Q bits in the received signal, and/or removing other non-user data from the received signal. The master eNodeB may then compare the decoded signal received from the coordinating eNodeB to its own decoded signal (and possibly decoded signals received from other coordinating eNodeBs) and select the best decoded signal. Alternatively, the master eNodeB may combine the decoded signal from a UE that is received from a coordinating eNodeB with its own the decoded signal from the UE, and/or with one or more other versions of the decoded signal from the UE that are received from other coordinating eNodeBs, in order to generate a combined signal for the particular UE.

This second type of joint processing may be referred to herein as "decentralized" joint processing. It should be understood that varying degrees of decentralized joint processing are possible. That is, the amount of decoding and processing may vary. For example, decentralized joint processing could simply involve decoding the received signal before sending it to the master base station. However, joint processing could further involve compressing the decoded signal before sending it to the master base station (which could help to reduce the load on the backhaul links). Other examples are also possible.

As noted above, decentralized joint processing may reduce the size of the received signal before it is sent to the master base station. Therefore, while decentralized joint processing may increase the CPU load at the coordinating base stations, it can decrease the load on the backhaul link between the coordinating base station and the master base station.

In a further aspect, it should be understood that the above descriptions of joint processing that utilizes signals received and communicated between eNodeBs, can be classified as inter-eNodeB uplink CoMP. The same concepts may be applied in the context of intra-eNodeB joint processing, with the difference being that a single eNodeB will use uplink signals received in two or more sectors it serves for joint processing, instead of using signals sent to the eNodeB by other eNodeBs.

III. Carrier Aggregation

Referring back to FIG. 1A, an exemplary wireless communication network, such as LTE network 10, may also be configured for carrier aggregation. As such, an eNodeB 12 may provide carrier-aggregation service to UE 16. In particular, through RRC signaling at the time of UE attachment or later, the eNodeB 12 may specify a set of downlink carriers on which the eNodeB will be serving the UE 16 with carrier-aggregation service, with the set including at least a first component carrier F1 and a second component carrier F2. In practice, the first and second component carriers could be contiguous (with adjacent downlink channels and adjacent uplink channels) or non-contiguous (with non-adjacent, possibly distant downlink channels and non-adjacent, possibly distant uplink channels), and thus the carrier-aggregation service could be considered contiguous or non-contiguous. As such, the MAC scheduler of eNodeB 12 may assign resource blocks on each component carrier.

An eNodeB may learn of the carrier-aggregation capabilities of a UE in various ways. In an exemplary embodiment, UEs may indicate their respective carrier-aggregation capabilities when they register with the network. In particular, a UE may indicate its carrier-aggregation capability (e.g., whether or not it is capable of carrier aggregation), in a UE capability report message that is sent to the eNodeB during the registration process.

As is explained in greater detail in section VII below, exemplary embodiments may involve an eNodeB (and/or other network components) selecting an uplink CoMP mode for a given UE based at least in part on the carrier-aggregation status of the UE (e.g., whether or not carrier aggregation is being utilized for the UE on the downlink).

IV. Usage Classification of UEs

In a further aspect, LTE utilizes a number of traffic classes, which can have varying quality of service (QoS) attributes. In LTE, there are nine standardized LTE QoS Class Identifiers (QCI), which may be referred to as QCI 1 to QCI 9, respectively. Each QCI may have different QoS attributes, such as bit rate, packet delay budget, packet loss rate, and a scheduling priority relative to other QCIs. Typically, QCI 1 to QCI 5 are defined so as to provide a guaranteed bit rate (GBR) to traffic flows assigned thereto, and thus may be referred to as GBR QCIs. QCI 6 to QCI 9 are typically defined so as to provide a variable bit rate for traffic flows assigned thereto, and thus may be referred to as non-GBR QCIs.

In an example embodiment, a service provider may have configured network 10 such that QCIs are assigned to UEs based on the data usage of respective user accounts associated with the UEs. In an exemplary embodiment, user accounts may be associated with one or two different QCIs, depending upon the respective data usage levels of the user accounts. For example, network 10 may associate QCI 8 with user accounts that utilize significantly more network resources than average (e.g., more than some threshold amount of data per month), and may associate QCI 9 with other user accounts (e.g., those that use less than some threshold amount of data per month). The user accounts that are associated with QCI 9 may be referred to as being associated with a normal or standard data-usage class, which user accounts that are associated with QCI 9 may be referred to as being associated with a heavy data-usage class. Of course, other types of classification systems are also possible.

Accordingly, when a UE that is associated with a given user account engages in a communication via an LTE network, the uplink and/or downlink traffic flows may be assigned the QCI that is associated with the given user account. For example, in FIG. 1B, UE 16 may be associated the user-account of a heavy user, while UE 17 may be associated the user-account of a normal or standard user. As such, eNodeB 12 may assign QCI 8 to traffic flows to and from UE 16, and may assign QCI 9 to traffic flows to and from UE 17.

Note that similar traffic classes may be defined in other types of air-interface protocols, and that methods and systems described by way of example as involving LTE classifications may instead utilize other classification systems, without departing from the scope of the invention.

As is explained in greater detail in section VIII below, exemplary embodiments may involve an eNodeB (and/or other network components) selecting an uplink CoMP mode for a given UE based at least in part on the data-usage class that is associated with the UE.

V. Time Division Duplexing

Depending on the air interface protocol and other factors, each coverage area in an access network may be arranged to operate in either a frequency division duplex (FDD) configuration or a time division duplex (TDD) configuration. In an FDD configuration, separate frequencies are used for downlink and uplink communication, so that downlink and uplink communication can occur simultaneously. In a TDD configuration, on the other hand, the same frequency is used for both downlink and uplink communication, and downlink and uplink communications are separated from each other by alternating use of the frequency over time.

As noted above, the air interface in each coverage area may further have a particular frame structure that defines periodically recurring time units in which information can be communicated between the base station and UEs. For example, a frame structure could define periodically recurring frames of 10 milliseconds, each consisting of a sequence of 10 subframes of 1 millisecond each. Moreover, the example frame structure could then further divide each subframe into a sequence of smaller time units, such as a pair of resource blocks for instance. Other example frame structures are possible as well.

In a TDD system, the air interface may define a single such frame structure for combined downlink/uplink use, with portions of each frame alternating between downlink and uplink in a defined sequence. For example, the first three subframes of each frame may be designated for downlink use, the next two subframes may be designated for uplink use, the next three subframes may be designated for downlink use, and the last two subframes may be designated for uplink use. In each frame of such a system, certain ones of the downlink subframes or portions thereof may again be designated to carry page messages and system overhead signaling such as a reference signal, and other downlink subframes or portions thereof may be designated to carry bearer traffic to served UEs. Further, certain ones of the uplink subframes or portions thereof may be designated to carry access messages and other overhead signaling, and other uplink subframes or portions thereof may be designated to carry bearer traffic to the serving base station.

Figure 3:
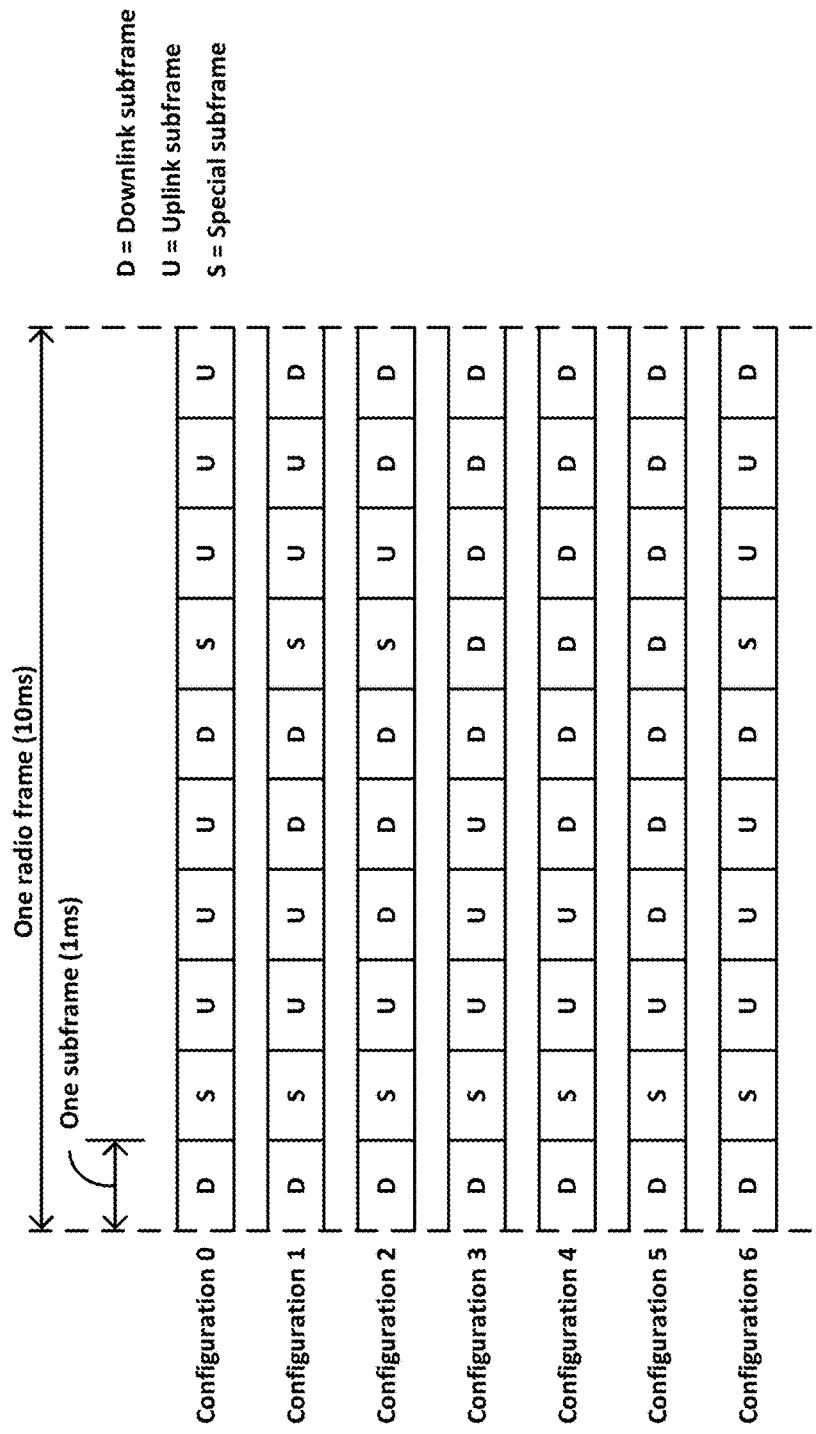
FIG. 3 illustrates an exemplary division of the uplink resources in a given wireless coverage area into resource blocks.

LTE defines seven different TDD frame structures, which differ from each other in terms of which subframes are set aside for downlink communication and which subframes are set aside for uplink communication. FIG. 3 depicts these frame structures, labeled as configurations 0 through 6. In each of these frame structures, subframes set aside for downlink communications are labeled as "D" and subframes set aside for uplink communication are labeled as "U". Further, in accordance with LTE, where a frame transitions over time from downlink to uplink, the frame includes a "special subframe" that is not used for either downlink or uplink communication, designed to give a UE time to make the transition to uplink communication. These special subframes are labeled as "S".

Each LTE base station may be configured to operate with a given one of these LTE frame structures and may broadcast an overhead specification of its frame structure so that UEs being served by the base station can operate with the applicable frame structure. For instance, the base station may broadcast an indication of its configuration (such as the configuration number or other configuration identifier) in a System Information Block #2 (SIB2) at a predefined position in a radio frame, and a served UE may read that SIB2 indication to determine the frame structure used by the base station.

In a further aspect, the number of subframes allocated for the uplink and downlink may vary between the different TDD frame configurations shown in FIG. 3. Thus, as is explained in greater detail in section VII(B) below, an exemplary embodiment may involve an eNodeB (and/or other network components) selecting an uplink CoMP mode for a given UE based at least in part on the TDD frame configuration in the UE's serving sector.

VI. Exemplary RAN Components

Figure 4:
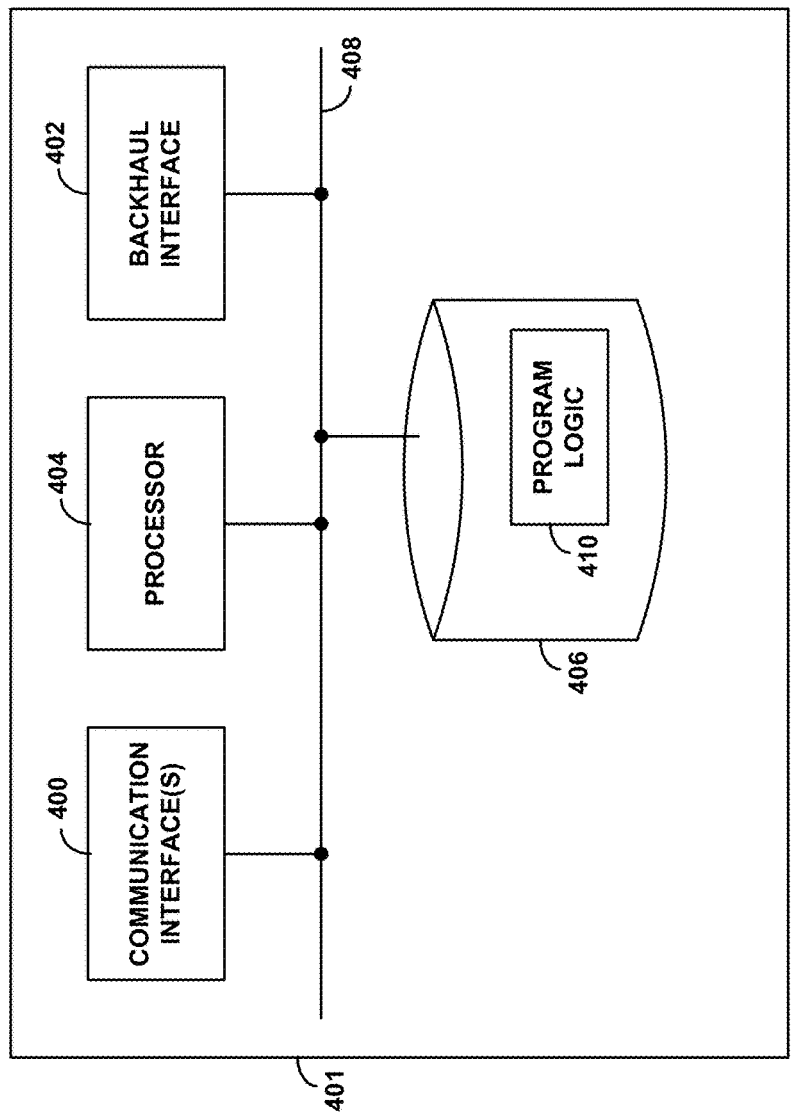
FIG. 4 is a simplified block diagram exemplifying a network component, according to an exemplary embodiment.

FIG. 4 is a simplified block diagram exemplifying a network component, according to an exemplary embodiment. In particular, FIG. 4 illustrates functional components that might be found in a network component 401 that is arranged to operate in accordance with the embodiments herein. As shown, the network component 401 may include at least one communication interface 400 for air-interface communications, a backhaul interface 402, a processor 404, and data storage 406, all of which may be communicatively linked together by a system bus, network, or one or more other connection mechanisms 408.

In practice, network component 401 may take the form of an eNodeB, or may take the form of another component of an LTE or CDMA network. Further, the illustrated components of network component 401 (e.g., communication interface 400, a backhaul interface 402, a processor 404, and/or data storage 406) may be distributed and/or subdivided between one or more entities in an LTE network and/or in a CDMA network. It should be understood that an exemplary system may also take the form of another network entity or combinations of other network entities, without departing from the scope of the invention.

In network component 401, communication interface 400 may comprise one or more or wired or wireless communication interfaces and/or other associated equipment for engaging in communications with other network entities and/or for engaging in RF communications with mobile stations according to one or more air interface protocols. Chipsets, antennas, and/or other components for such RF communications are readily available and well known to those skilled in the art. Backhaul interface 402 may comprise any sort of communication link or mechanism enabling the network component 401 to exchange signaling and bearer data with other network entities, such as an X2 link, for instance. Further, processor 404 may comprise one or more processors (e.g., general purpose and/or special purpose processors), such as microprocessors for instance. Chipsets, ports, and/or other components for such backhaul communications are readily available and well known to those skilled in the art.

Data storage 406 may be a non-transitory computer readable medium. For example, data storage 406 may take the form of one or more volatile and/or non-volatile storage components, such as magnetic, optical, or organic storage components, integrated in whole or in part with processor 404. As further shown, data storage 406 contains program logic 410 (e.g., machine language instructions) executable by processor 404 to carry out various functions, such as the functionality of the exemplary methods and systems described herein.

In some embodiments, network component 401 may include at least program instructions 410 stored in data storage 406, which are executable by processor 404 to: (a) determine a carrier-aggregation status corresponding to a UE that is operating in a coverage area of the base station, (b) based at least in part on the carrier-aggregation status corresponding to the UE, select an uplink CoMP mode from a plurality of available uplink CoMP modes, and (c) receive, via a communication interface 400, an uplink communication from the UE according to the selected uplink CoMP mode.

Further, the program instructions 410 may be executable to consider other factors when selecting an uplink CoMP mode for the UE. For example, the program instructions 410 may be executable to determine a data-usage class that is associated with the UE, and use the combination of the determined data-usage class and the carrier-aggregation status of the UE (and possibly other factors as well) as a basis for selecting the uplink CoMP mode for the UE. As another example, the program instructions 410 may be executable to determine a TDD frame configuration that is implemented in the coverage area in which the UE is operating (i.e., the UE's serving sector), and to use the combination of the determined TDD frame configuration and the carrier-aggregation status for the UE (and possibly other factors as well) as a basis for selecting the uplink CoMP mode for the UE.

Further, in some embodiments, the program instructions 410 may be executable to determine whether or not a given UE is located (e.g., being served) in a border cell, and to condition the use of an exemplary method to intelligently select an uplink CoMP mode for the UE, upon a determination that the UE is located in a border sector (e.g., a sector having a neighbor sector that is served by a different eNodeB). In such embodiments, a network component 401 may disable uplink CoMP whenever a UE is not located in a border sector, and only use an exemplary method to determine whether to enable uplink CoMP for a UE, and/or determine what type of uplink CoMP to enable for a UE, when the UE is located in a border sector.

VII. Selection of an Uplink CoMP Mode Based on Carrier-Aggregation Status

As noted above, exemplary methods may help to dynamically enable and disable uplink CoMP, and/or help to select a particular uplink CoMP mode when CoMP is enabled, based on one or more of a number of different factors. In some embodiments, the selection of an uplink CoMP mode for a particular UE may be based on the carrier-aggregation status of the UE.

More specifically, as explained above, when carrier aggregation is implemented, a UE sends acknowledgment (ACK) messages to acknowledge receipt of data that is sent to the UE on the downlink. And, as further noted above, the UE may only send each ACK message once, which makes receipt of the ACK more important. Further, the UE only sends the ACK on one uplink channel (e.g., in its serving sector), regardless of how many downlink channels are being used for carrier aggregation service. Accordingly, an exemplary method may help to determine when carrier aggregation is being provided for particular UEs, and responsively enable and/or adjust the type of uplink CoMP in an effort to improve uplink service, increase the chances of receiving each ACK, and/or share ACK messages between eNodeBs that are providing carrier aggregation (in those cases where carrier aggregation includes carriers from multiple eNodeBs), for those UEs that are provided with carrier-aggregation service.

Figure 5:
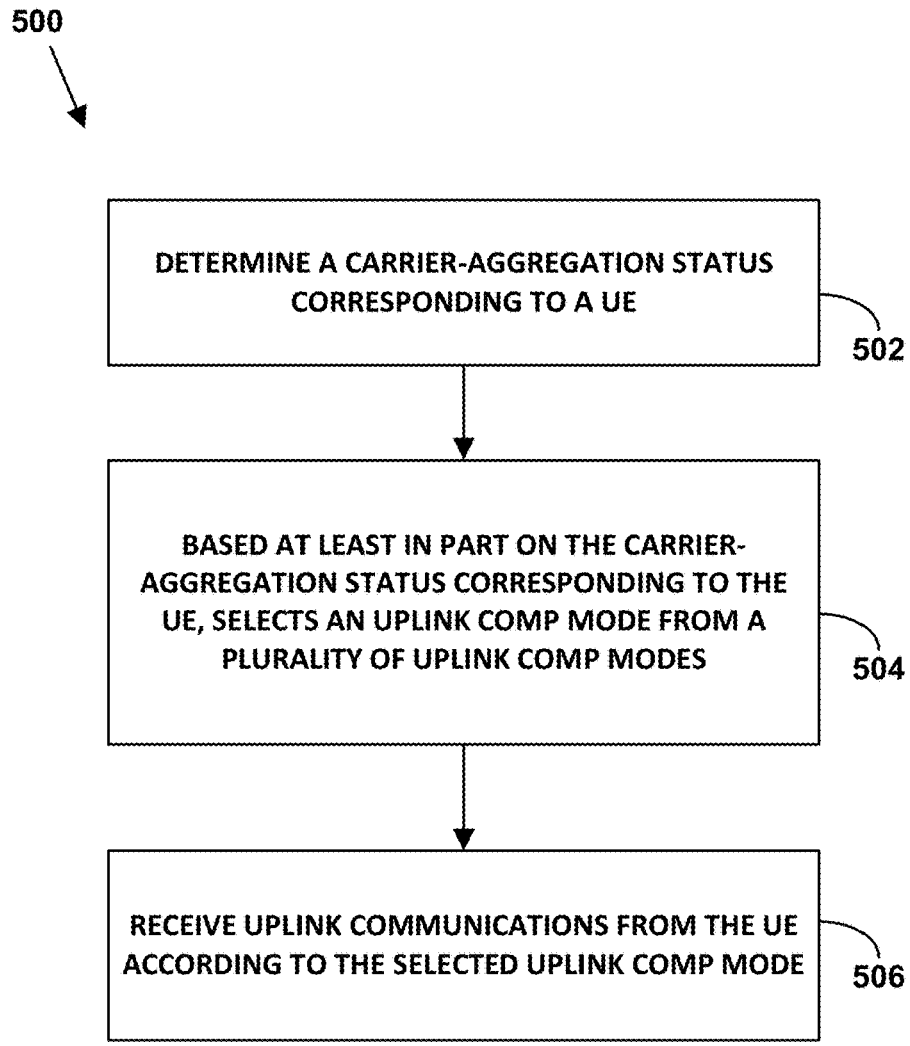
FIG. 5 is flow chart illustrating a method, according to an exemplary embodiment.

FIG. 5 is flow chart illustrating a method 500, according to an exemplary embodiment. Exemplary methods such as method 500 may be implemented by an eNodeB, such as eNodeB 12, and/or by one or more other network entities. Further, other types of base stations and/or network entities, operable to provide service under protocols other than LTE, may also implement exemplary methods. For simplicity, however, exemplary methods may be described herein as being implemented by an eNodeB. Further, method 500 may be implemented for purposes other than those described herein, without departing from the scope of the invention.

As shown in block 502, method 500 involves an eNodeB determining a carrier-aggregation status corresponding to a UE that is operating in a coverage area served by the eNodeB. Then, based at least in part on the carrier-aggregation status corresponding to the UE, the eNodeB selects an uplink CoMP mode from a plurality of uplink CoMP modes, as shown by block 504. The eNodeB may then receive uplink communications from the UE according to the selected uplink CoMP mode, as shown by block 506.

A. Determining the Carrier-Aggregation Status for a UE

At block 502, various techniques may be utilized to determine the carrier-aggregation status corresponding to a given UE. In some embodiments, the determined carrier-aggregation status may indicate either: (a) that carrier-aggregation is applicable to the UE or (b) that carrier-aggregation is not applicable to the UE.

For instance, in an exemplary embodiment, block 502 may involve a network component (e.g., an eNodeB) determining whether or not carrier aggregation is applicable to the UE. In some implementations, carrier aggregation may be considered applicable to a UE if it is determined that the UE is configured for carrier-aggregation service, such that the UE can be provided with carrier-aggregation service. As such, block 502 may involve determining whether or not the UE is configured for carrier-aggregation service. Carrier aggregation may then be deemed to be applicable to a particular UE if the particular UE is configured for carrier aggregation (and conversely, deemed inapplicable if the UE is not configured for carrier aggregation). Accordingly, the carrier-aggregation status determined at block 502 may indicate either: (a) that the UE is configured for carrier aggregation or (b) that the UE is not configured for carrier aggregation.

In other implementations, carrier aggregation may be considered applicable to a UE when carrier-aggregation service is actually enabled for the UE. In other words, block 502 may involve determining whether or not carrier aggregation is being utilized for downlink communications with the UE. And, if carrier aggregation is being utilized for downlink communications with the UE, then carrier aggregation may be deemed to be applicable to the UE (and conversely, may be deemed inapplicable if carrier aggregation is not being utilized for downlink communications with the UE). Accordingly, the carrier-aggregation status determined at block 502 may indicate either: (a) that carrier aggregation is enabled for the UE or (b) that carrier aggregation is not enabled for the UE.

Further, in some implementations, the determination of the carrier-aggregation status at block 502 may also involve the network (e.g., the serving eNodeB) determining the number of carriers that are being utilized to provide carrier-aggregation to the UE. In such embodiments, the carrier-aggregation status determined at block 502 may simply be a number, and in particular, the number of carriers that are being utilized to provide carrier aggregation for the UE. For example, if a first UE is being provided with carrier aggregation using four carriers, but carrier aggregation service is not enabled a second UE, then the carrier aggregation status of the first UE may be determined to be "4", while the carrier aggregation status of the second UE may be determined to be "0". Many other examples are also possible.

B. Uplink CoMP Mode Selection for a UE Based on its Carrier-Aggregation Status At block 504, various techniques may be utilized to select an uplink CoMP mode for a UE based on the carrier-aggregation status of the UE.

For example, consider an implementation such as described above, where block 502 involves determining whether or not carrier aggregation is applicable to the UE. In such an implementation, if the carrier-aggregation status indicates that carrier aggregation is applicable to the UE, then block 504 may involve the serving eNodeB enabling uplink CoMP for uplink communications with the UE. Otherwise, if the carrier-aggregation status indicates that carrier aggregation is not applicable to the UE, then the serving eNodeB may disable uplink CoMP for the UE (which in some cases, may simply involve refraining from enabling uplink CoMP for the UE). By enabling uplink CoMP for a UE that is served with carrier aggregation, the serving eNodeB may increase the chances that ACK messages are successfully received and/or share ACK messages with other eNodeBs that are coordinating to provide uplink CoMP and/or to provide carrier aggregation service for the UE.

In cases where inter-eNodeB CoMP is utilized, an exemplary method may further involve determining whether the sectors that are selected to provide uplink CoMP for UE (e.g., using adaptive selection techniques) are served by two or more eNodeBs. In this scenario, any eNodeB other than the serving eNodeB will not know when an ACK is received, unless the other eNodeB is informed by the serving eNodeB. Accordingly, if the serving eNodeB determines that one or more other eNodeBs are coordinating to provide uplink CoMP for the UE, the eNodeB may select an uplink CoMP mode in which the information that is shared by the serving eNodeB with the other eNodeBs in the CoMP cluster includes ACK messages.

In some cases, the selection of the CoMP mode may be more granular than simply determining whether to enable or disable a particular type of uplink CoMP (i.e., the selection may be made from three or more different CoMP modes). As an example, a more granular selection of the CoMP mode may take into account the number of carriers that are being utilized in carrier aggregation for the UE.

For instance, the serving eNodeB may determine determining the total number of carriers that are being utilized for carrier aggregation service with the UE. The serving eNodeB may then use the total number of carriers as a basis for selecting one of two or more uplink CoMP modes in which CoMP is enabled to at least some extent. And, if it is determined that carrier aggregation is not being utilized for the UE (e.g., if the total number of carriers is determined to be zero or one), then uplink CoMP may be disabled for the UE; or perhaps enabled to a lesser extent than in the two or more CoMP modes that may be selected when carrier aggregation is being utilized for the UE.

As an example, two thresholds may be established for the number of carriers; a higher threshold and a lower threshold (e.g., two carriers and four carriers). If the total number of carriers for a UE is less than the lower threshold, then a first uplink CoMP mode may be selected for the UE. For instance, if the total number of carriers is determined to be 0 or 1, indicating carrier aggregation is not being utilized for the UE, then the first uplink CoMP mode may disable uplink CoMP, or could perhaps involve less coordination than the CoMP modes from which the selection is made when carrier aggregation is being utilized.

More specifically, if the total number of carriers for the UE is between the lower and upper threshold (e.g., 2 or 3 carriers, when the lower and upper threshold are set at two and four carriers, respectively), then a second uplink CoMP mode may be selected for the UE. And, if the total number of carriers is greater than the upper threshold (e.g., greater than or equal to 4 carriers, when the upper threshold is four carriers), then a third uplink CoMP mode may be selected for the UE.

The second uplink CoMP mode may involve some level of coordination between eNodeBs, but may place less demand on backhaul (e.g., X2) links between eNodeBs and/or place less processing demand on secondary eNodeBs in a CoMP cluster, as compared to the third uplink CoMP mode. For example, the second and third CoMP modes may both involve joint reception, but the second CoMP mode may utilizes less resources for joint processing than the third CoMP mode. Further, as noted above, the first CoMP mode (e.g., which disables uplink CoMP) may place less demand on backhaul links between eNodeBs and/or place less processing demand on secondary eNodeBs in a CoMP cluster, as compared to both the second and third uplink CoMP mode.

In a further aspect, other factors may be considered in the selection of the uplink CoMP mode, in addition to the carrier-aggregation status of a UE. For example, in some embodiments, the serving eNodeB may take into account the CPU load of one or more secondary eNodeBs in the CoMP group that serves a UE. In such an embodiment, an exemplary method may further involve a serving eNodeB determining a central processing unit (CPU) load of at least one secondary eNodeB in a CoMP group serving a UE. The serving eNodeB may then use both the CPU load of the second eNodeB and the carrier-aggregation status of the UE, and possibly other factors, as a basis for selecting the uplink CoMP mode for the UE.

For example, the serving eNodeB may determine whether or not the CPU load of the second base station is greater than a threshold. If it is determined that the CPU load of the second eNodeB is greater than the threshold, then the serving eNodeB may select a first CoMP mode. On the other hand, if it is determined that the CPU load of the second eNodeB is less than or equal to the threshold, then the serving eNodeB may select a second CoMP mode. In such an embodiment, the first and second CoMP modes may both involve joint reception. However, the second CoMP mode may place greater processing demands on the second eNodeB as compared to the first CoMP mode places on the second base station. For instance, the first CoMP mode may involve centralized joint processing, while the second CoMP mode may involve decentralized joint processing. Other examples are also possible.

In another aspect, when selecting the uplink CoMP mode for a UE, the serving eNodeB may take into account a data-usage class (data-usage class) of the UE. For example, the serving eNodeB may determine which particular data-usage class, from a plurality of pre-defined data-usage classes, is associated with a particular UE. The serving eNodeB may then consider both the determined data-usage class and the carrier-aggregation status of the UE, and possibly other factors as well, in the selection of the uplink CoMP mode for the UE. Further, in an example embodiment, the plurality of pre-defined data-usage classes may include at least a first class and a second class. For instance, UE's may be classified in either a heavy-user class or a normal-user class. Other examples of classification systems, with more than two classes and/or different types of classes, are also possible. Further, additional details regarding the manner in which data-usage classification may be utilized to select an uplink CoMP mode are provided in section VIII below.

In yet another aspect, when selecting the uplink CoMP mode for a UE, the serving eNodeB may take into account the TDD frame configuration is implemented in the coverage area in which the UE is operating (e.g., in the serving sector for the UE). More specifically, different TDD frame configurations may differ in the distribution of resources between the uplink and downlink slots. For example, consider the seven different frame configurations that are currently defined for LTE, which are shown in FIG. 2. As shown, LTE frame configurations 0 to 6 may provide various distributions of resources between the uplink and downlink. As an example, frame configuration 1 designates four downlink subframes, and four uplink subframes, per frame. Frame configuration 2 designates six downlink subframes, and only two uplink subframes, per frame. As such, implementing frame configuration 2 reduces the amount of uplink bandwidth that is available in a sector, as compared to when frame configuration 1 is implemented. Other examples of differing resource distribution between the uplink and downlink also exist.

By reducing the maximum level of uplink traffic in a given sector, frame configuration 2 may also reduce the maximum amount of demand that uplink CoMP can place on the backhaul network as a result of UEs that are served by the given sector, as compared to when frame configuration 1 is implemented. Accordingly, an eNodeB may adjust the uplink CoMP mode or modes that are selected for UEs it serves based at least in part on the TDD frame configuration that is implemented in the respective sectors in which the UEs are served. Thus, an exemplary method may further involve the serving eNodeB determining the TDD frame configuration for the UE's serving sector. The serving eNodeB may then consider the combination of the determined TDD frame configuration and the determined carrier-aggregation status for the UE, and possibly other factors as well, in the selection of the uplink CoMP mode for the UE.

More specifically, when the TDD frame configuration for a particular sector allocates a lesser amount of bandwidth to the uplink (e.g., a lesser number of subframes per frame), a serving eNodeB for the sector may be more likely to select an uplink CoMP mode that places a greater demand on backhaul links (per uplink subframe), for UEs that are served in the sector, and vice versa. For example, if the TDD frame configuration for a given sector reduces the total bandwidth available for uplink communications in the given sector, then the serving eNodeB may be more likely to select an uplink CoMP mode that involves centralized joint processing, for a UE that is operating in the given sector.

In practice, the serving eNodeB may take a given sector's TDD frame configuration into account by adjusting the way in which other factors are applied in the process of selecting the uplink CoMP mode. In this regard, the eNodeB may adjust the uplink CoMP selection process for all UEs in a given sector according to the sector's TDD frame configuration. For example, consider a first sector (sector A) that is using frame configuration 1, and a second sector (sector B) that is using frame configuration 2. Sector A thus has four uplink subframes per frame, while sector B only has two uplink subframes per frame. Thus, if all of the uplink subframes are being utilized in both sector A and sector B, the amount of uplink traffic sector B during a given time period will be half of that in sector B during the same time period.

Since the maximum uplink traffic level is lower in Sector B, the serving eNodeB(s) for sectors A and B may adjust the processes for selecting a UE's uplink CoMP mode based on the UE's carrier-aggregation status in sector A and/or sector B. In particular, the selection processes for sectors A and/or B may be adjusted as necessary, such that it is more likely that a CoMP mode that involves centralized joint processing will be selected for a UE in sector B, than it is for a UE in sector A. For example, consider an implementation where the selection of an uplink CoMP mode for a UE is based at least in part on the number of carriers being utilized for carrier aggregation; and in particular, where a CoMP mode that involves centralized joint processing is selected if the number of downlink carriers utilized for carrier aggregation is above a certain threshold number. In such an implementation, the threshold number of carriers required for selection of the centralized joint processing mode in sector B may be set to a lower value than the threshold number for selection of the same mode in sector A. For instance, since sector B is using frame configuration 2, while sector A is using frame configuration 1, the threshold for selecting centralized joint processing in sector B may be set to two carriers, while the threshold in sector A may be set to four carriers. As a result, the likelihood of selecting uplink CoMP with centralized joint processing for a given UE in sector B may be greater than the likelihood of selecting uplink CoMP with centralized joint processing for a given UE in sector A.

VIII. Selecting an Uplink CoMP Mode Based on Data-Usage Class

As noted above, in some scenarios, it may be desirable for a service provider to provide more favorable service to some users, than it provides to others. For example, a service provider may impose a relatively strict policy on a UE that is associated with a user-account of a heavy data user (e.g., one that engages in an amount of data communication that is deemed to be excessive). Further, as noted above, enabling CoMP can increase the amount of network resources that are allocated for a particular UE's uplink communication. Accordingly, in some scenarios, such as when there is heavy uplink traffic in a coverage area, it may be desirable to disable uplink CoMP for heavy users, in the hope that this will free up uplink resources for normal users.

In this regard, it may also be desirable to consider whether a particular UE is associated with a heavy user or a normal user when selecting an uplink CoMP mode for the particular UE; e.g., by making it more likely that uplink CoMP will be disabled for a heavy user than it is for a normal user, and vice versa. More generally, some exemplary methods may base the selection of the uplink CoMP mode for a particular UE on a data-usage class that is assigned to the UE. For instance, a serving eNodeB may determine whether a given UE is associated with a heavy-user class or a normal-user class, and take the determined data-usage class into account when selecting an uplink CoMP mode for the UE.

Figure 6:
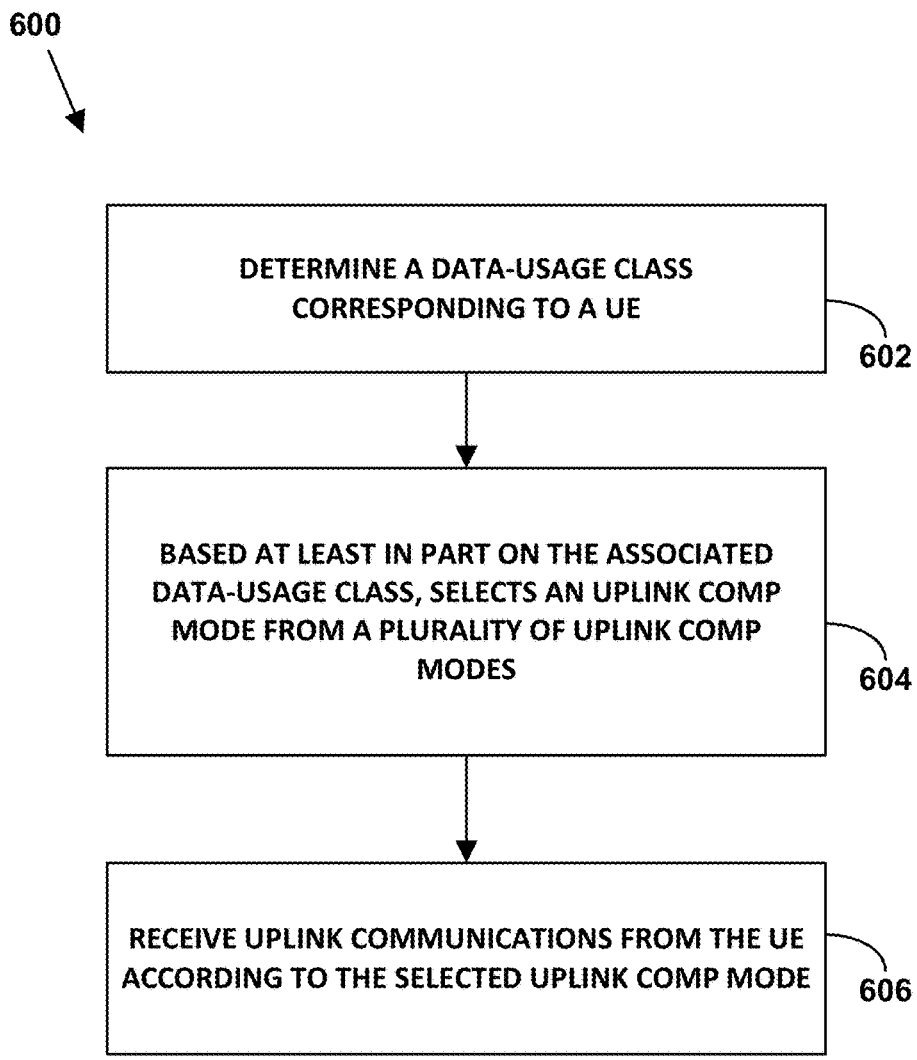
FIG. 6 is flow chart illustrating another method, according to an exemplary embodiment.

FIG. 6 is flow chart illustrating a method 600, according to an exemplary embodiment. Exemplary methods such as method 600 may be implemented by an eNodeB, such as eNodeB 12, and/or by one or more other network entities. Further, other types of base stations and/or network entities, operable to provide service under protocols other than LTE, may also implement exemplary methods. For simplicity, however, exemplary methods may be described herein as being implemented by an eNodeB. Further, method 600 may be implemented for purposes other than those described herein, without departing from the scope of the invention.

As shown in block 602, method 600 involves an eNodeB determining a data-usage class that is associated with a UE that is operating in a coverage area served by the eNodeB. Then, based at least in part on the associated data-usage class, the eNodeB selects an uplink CoMP mode from a plurality of uplink CoMP modes, as shown by block 604. The eNodeB may then receive uplink communications from the UE according to the selected uplink CoMP mode, as shown by block 606.

In an exemplary embodiment, a service provider may classify each user account in one of two data-usage classes: a heavy-usage class and a normal-usage (or standard-usage) class. The heavy-usage class corresponds to user accounts that consume a large amount of data (e.g., greater than some predetermined threshold), while the normal-usage class corresponds to user accounts that consume comparatively less data (e.g., less the predetermined threshold). As a specific example, in an LTE network, QCI 8 may be associated with user accounts (and UEs associated with user accounts) that utilize more than a threshold amount of data per billing cycle, while QCI 9 may be associated with user accounts (and UEs associated with user accounts) that use less than the threshold amount of data per billing cycle. Accordingly, in some examples, an eNodeB may disable uplink CoMP for UEs that are associated with QCI 8, and enable uplink CoMP for UEs that are associated with QCI 9.

In other examples, an eNodeB may consider the data-usage class of UE in combination with other factors, such that the likelihood of utilizing uplink CoMP, and/or the amount of expected resource usage for uplink CoMP, are reduced for a UE that is associated with a heavy data-usage class (e.g., QCI 8), as compared to a UE associated with a normal data-usage class (e.g., QCI 9). It should be understood, of course, that other data-usage classification systems and/or other techniques for selecting an uplink CoMP mode based on a UE's data-usage class, are also possible.

IX. Conclusion

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware

We claim:

1. A method comprising:
   determining, by a first base station, a carrier-aggregation status corresponding to a user equipment (UE) that is operating in a coverage area of the base station;
   based at least in part on the carrier-aggregation status corresponding to the UE, the first base station selecting an uplink coordinated multipoint (CoMP) mode from a plurality of uplink CoMP modes; and
   receiving, by the first base station, an uplink communication from the UE according to the selected uplink CoMP mode;
   wherein determining the carrier-aggregation status comprises determining whether or not carrier aggregation is applicable for downlink communications with the UE, and wherein selecting the uplink CoMP mode from the plurality of uplink CoMP mode comprises:
      if it is determined that carrier aggregation is not applicable for downlink communications with the UE, then disabling uplink CoMP; and
      if it is determined that carrier aggregation is applicable for downlink communications with the UE, then: (i) determining a total number of carriers that are applicable for carrier aggregation service with the UE, and (ii) using the total number of carriers as a basis for selecting the uplink CoMP mode from the plurality of uplink CoMP modes.

2. The method of claim 1, wherein the first base station comprises an eNodeB in a Long Term Evolution (LTE) network.

3. The method of claim 1, wherein determining the carrier-aggregation status comprises determining whether or not carrier aggregation is applicable to the UE.

4. The method of claim 3, wherein determining the carrier-aggregation status comprises at least one of: (a) determining whether or not carrier aggregation is being utilized for downlink communications with the UE and (b) determining whether or not the UE is configured for carrier-aggregation service.

5. The method of claim 3, wherein selecting the uplink CoMP mode from the plurality of uplink CoMP modes comprises:
   if the carrier-aggregation status indicates that carrier aggregation is applicable to the UE, then enabling uplink CoMP for uplink communications with the UE; and
   otherwise, if the carrier-aggregation status indicates that carrier aggregation is not applicable to the UE, then disabling uplink CoMP for uplink communication with the UE.

6. The method of claim 3, wherein the first base station is in an uplink CoMP cluster with one or more second base stations, and wherein selecting the uplink CoMP mode from the plurality of uplink CoMP modes comprises:
   if it is determined that carrier aggregation is not applicable for downlink communications with the UE, then disabling uplink CoMP; and
   if it is determined that carrier aggregation is applicable for downlink communications with the UE, then selecting an uplink CoMP mode in which the first base station shares acknowledgement (ACK) messages from the UE with at least one second base station in the uplink CoMP group.

7. The method of claim 3, wherein selecting the uplink CoMP mode from the plurality of uplink CoMP modes comprises:
   if it is determined that carrier aggregation is not applicable for downlink communications with the UE, then disabling uplink CoMP; and
   if it is determined that carrier aggregation is applicable for downlink communications with the UE, then:
      (i) determining, by a first base station, a central processing unit (CPU) load of a second base station, wherein the first base station and the second base station provide service in a radio access network; and
      (ii) using the CPU load of the second base station as a further basis for selecting the uplink CoMP mode from the plurality of uplink CoMP modes.

8. The method of claim 7:
   wherein the first CoMP mode comprises centralized joint processing; and
   wherein the second CoMP mode comprises decentralized joint processing.

9. The method of claim 1, further comprising:
   determining, by the first base station, a data-usage class that is associated with the UE, wherein the data-usage class is one of a plurality of pre-defined data-usage classes;
   the first base station using the combination of the determined data-usage class and the carrier-aggregation status as a basis for selecting the uplink CoMP mode from the plurality of uplink CoMP modes.

10. The method of claim 1, further comprising:
    determining, by the first base station, a time-division duplex (TDD) frame configuration that is implemented in the coverage area in which the UE is operating; and
    the first base station using the combination of the determined TDD frame configuration and the carrier-aggregation status as a basis for selecting the uplink CoMP mode from the plurality of uplink CoMP modes.

11. The method of claim 1, wherein using the total number of carriers as a basis for selecting the uplink CoMP mode comprises:

if the total number of carriers is less than or equal to a threshold number, then selecting a first CoMP mode for uplink communications with the UE; and if the total number of carriers is greater than the threshold number, then selecting a second CoMP mode for uplink communications with the UE.

12. The method of claim 1, wherein the first CoMP mode and the second CoMP mode both involve joint reception, and wherein the first CoMP mode utilizes less resources, as compared to the second CoMP mode on an a communication link between the first base station and one or more second base stations in a cluster providing uplink CoMP service to the UE.

13. The method of claim 1, further comprising conditioning the method of claim 1 upon a determination that the UE is located in a border coverage area.

14. A method comprising:

determining, by a first base station, a data-usage class that is associated with a user equipment (UE), wherein the data-usage class is one of a plurality of pre-defined data-usage classes comprising at least a first data-usage class that indicates that a corresponding user account has a standard data-usage level and a second data-usage class that indicates that a corresponding user account has a heavy data-usage level;

based at least in part on the associated data-usage class, the first base station selecting an uplink coordinated multipoint (CoMP) mode from a plurality of uplink CoMP modes; and receiving, by the first base station, an uplink communication from the UE according to the selected uplink CoMP mode.

15. The method of claim 14, wherein a given user account is assigned to the first data-usage class if data usage associated with the given user account is below a threshold level, and wherein the given user account is assigned to the second data-usage class if data usage associated with the given user account is above a threshold level.

16. The method of claim 14, wherein the first data-usage class comprises UEs that are assigned QCI 9, and wherein the second data-usage class comprises UEs that are assigned QCI 8.

17. The method of claim 14, further comprising:

determining, by the first base station, a time-division duplex (TDD) frame configuration that is implemented in the coverage area in which the UE is operating; and the first base station using the combination of the determined TDD frame configuration and the determined data-usage class as a basis for selecting the uplink CoMP mode from the plurality of uplink CoMP modes.

18. A network component comprising:

one or more communication interfaces configured for uplink and downlink communication with a user equipment (UE) that operates in a coverage area of the base station;

at least one processor; and a non-transitory computer readable medium comprising program instructions stored thereon that are executable by the at least one processor to:

(a) determine a carrier-aggregation status corresponding to the UE;

(b) based at least in part on the carrier-aggregation status corresponding to the UE, select an uplink coordinated multipoint (CoMP) mode from a plurality of uplink CoMP modes; and (c) receive, via at least one of the communication interfaces, an uplink communication from the UE according to the selected uplink CoMP mode wherein determination of the carrier-aggregation status comprises a determination of whether or not carrier aggregation is applicable for downlink communications with the UE, and wherein selection of the uplink CoMP mode from the plurality of uplink CoMP mode comprises:

if it is determined that carrier aggregation is not applicable for downlink communications with the UE, then disabling uplink CoMP, and if it is determined that carrier aggregation is applicable for downlink communications with the UE, then: (i) determining a total number of carriers that are applicable for carrier aggregation service with the UE, and (ii) using the total number of carriers as a basis for selecting the uplink CoMP mode from the plurality of uplink CoMP modes.

19. A network component comprising:

one or more communication interfaces configured for uplink and downlink communication with a user equipment (UE) that operates in a coverage area of the base station;

at least one processor; and a non-transitory computer readable medium comprising program instructions stored thereon that are executable by the at least one processor to:

(a) determine a data-usage class that is associated with the UE, wherein the data-usage class is one of a plurality of pre-defined data-usage classes that indicate levels of data usage, wherein the plurality of pre-defined data-usage classes comprises at least a first data-usage class that indicates that a corresponding user account has a standard data-usage level and a second data-usage class that indicates that a corresponding user account has a heavy data-usage level;

(b) based at least in part on the associated data-usage class, select an uplink coordinated multipoint (CoMP) mode from a plurality of uplink CoMP modes; and (c) receive an uplink communication from the UE according to the selected uplink CoMP mode.

* * * * *